United States Patent Office 3,460,767
Patented Aug. 12, 1969

3,460,767
PROCESS FOR DISPERSING PIGMENTS IN LIQUID MEDIA
Leif Asbjornson Sonsthagen, 28 Wimbledon Close, The Downs, London SW. 20, England
No Drawing. Filed Feb. 2, 1965, Ser. No. 429,897
Claims priority, application Great Britain, Feb. 6, 1964, 5,036/64
Int. Cl. B02c 1/12
U.S. Cl. 241—16                          5 Claims This invention relates to an improved process for dispersing pigments in liquid media and more particularly but not exclusively represents an improvement to known processes wherein the pigment is dispersed in a liquid media by agitation with sand or other granular material small balls and so forth in apparatus specially designed for this purpose.

A continuous process of this general kind wherein the pigment and liquid medium are agitated with Ottawa sand or similar granules is disclosed in British Patent Specification 686,234 and suitable apparatus for the purpose is disclosed in British Patent Specification 810,005.

The high efficiency of this process is primarily due to the enormous number of shearing surfaces in the mill charge and the very high rate of shear which is induced by the moving parts of the apparatus. In consequence the power requirement for operating the apparatus is very high.

Unfortunately high power utilisation by the application of very strong shearing forces at a very high rate of shear also involves the generation of a correspondingly large amount of heat. This heat plus the heat of wetting has to be dissipated by the water cooling system of the apparatus and by raising the temperature of the mill base (that is to say that portion of the batch which is actually milled) as it passes through the apparatus.

Since the specific heat of the sand and of most mill bases is low it will be appreciated that with a non-aqueous base under a reasonably high power load a rapid temperature rise is unavoidable. In practice it is usual to find that the maximum time the mill base can be allowed to remain in the apparatus without excessive overheating is 10–20 minutes. This means that any mill base which cannot be milled within this time must be cooled and usually diluted and then remilled one or more times.

Research on mill-base formulations which are suitable for ball milling has shown that pigment solids and vehicle solids are to a considerable degree interchangeable without radically altering the viscosity of the mill base. It is well known that ball milling efficiency is highest when the vehicle solids in the mill base are reduced, but the pigment solids are increased to the level where the mill base still has the right viscosity yet contains a maximum volume of pigment without being excessively dilatant. The mill base vehicle must of course contain sufficient dispersing compounds to satisfy the adsorption requirements of the pigment surface, but without endangering the stability of the unadsorbed binder in the vehicle.

Where the composition and viscosity of the vehicle is constant, then the viscosity of the mill base will vary according to the volume and type of pigment used, and particularly the surface area and the shapes of its component discrete particles. However, where the pigment is also of constant type, then, as is well known, the viscosity of the mill base rises with the extent of the wetted pigment surface area, i.e. it rises with the extent of the pigment and vehicle interface area ($A_1$) in the dispersed system. ($A_1 = $ m.$^2$/cc. of dispersion.)

The present invention is based on my discovery that pastes which have constant viscosities and contain similar pigments and vehicles, also have similar $A_1$ values. Where the volume composition of the mill base is constant, then this $A_1$ value (and viscosity) rises during the dispersing process until all the pigment particles have been completely wetted and dispersed and no further size reduction takes place.

The basic operation of sand milling is to pump the mill base through a number of milling zones in each of which it is agitated with and sheared by sand. The resistance which is offered by the sand to the mill base which is being pumped through it increases with the degree of dispersion and increasing viscosity. If the viscosity of the mill base becomes excessively high, then the level of sand rises in the grinding tank. This means that the grains of sand become more widely separated; the rate of shear and also the milling efficiency of the apparatus is thereby reduced and, what is equally important, the rate of flow of mill base through the sand-separating screen is also greatly reduced.

To prevent these difficulties it is usually necessary to reduce the viscosity of the inflowing mill base to the low level which will ensure that its viscosity will not increase beyond an acceptable level during the milling process. Most sand-mill bases are over-diluted during the early stages of the milling process. This greatly reduces the efficiency of the mill and prolongs the time required to produce a satisfactory product.

Another feature is that a standard sand-mill base vehicle must always contain a relatively high percentage of binder to ensure that the mill base as it flows from the mill has adequate static and also dilution stability to prevent hard settlement of the pigment in storage, and colloidal pigment shock when the dispersion is further diluted with a more concentrated binder solution. This means that the mill-base vehicle will normally contain more binder than is needed in the mill base to ensure rapid dispersion of the pigment.

According to the present invention therefore it is proposed to modify a sand-milling or like process by reducing the initial resin and vehicle content of the mill base, and at the same time reducing the rate of feed into the mill. It also proposes to inject concentrated binder solution as a diluting vehicle into the grinding tank at one or more successive stages of the dispersing process in order to maintain the viscosity of the mill base at the best level as it flows through the mill and is finally separated from the sand as a fully dispersed and fully stabilised liquid dispersion. By this method the rate of production can be increased and at the same time a free-flowing, partially cooled and completely stable dispersion in which the vehicle contains sufficient resin to permit further dilution without creating conditions of colloidal pigment shock, can be produced.

It is believed that this procedure should eliminate the necessity for re-milling many colloidal pigment bases which today require at least two milling operations. At the same time it is expected that the overheating of the mill base will be prevented.

An example of the procedure it is proposed to follow is set out below.

Example

A sand mill with empty grinding tank capacity of 55 litres contains 28 litres (net volume) or 75.6 kg. of sand, and has a net mill base residence capacity of 27 litres.

A mill base containing Milori Blue with $A_v$ surface area 102 m.$^2$/cc. and $A_1$ value 8 m.$^2$/cc. of dispersion, has a volume composition at the point of outflow as follows:

Milori Blue ($S_g$ 1.8)

$A_v$ surface area 102 m.$^2$/cc. $P_v =$ $$\frac{A_1}{A_v} \text{ or } \frac{8}{102} = 0.0784 \text{ cc./cc.}$$

Alkyd solution 35 (short oil)

($S_g$ 0.94)      $V_v = 1 - P_v = 0.9216$ 1.0000 cc./cc.

Example batch containing 100 kg. Milori Blue

Pigment = 100 kg. Milori @ $S_g$ 1.8 = 55.56 litres.

The volume of 35% solution required to produce a mill base with $P_v$ 0.0784 cc./cc. is:

$$\left(\frac{55.56 \times 100}{7.84}\right) - 55.56 = 653.11 \text{ litres of vehicle}$$

The batch therefore has the following composition

Milori _____ 100 kg. at $S_g$ 1.8 = 55.56 litres.
Alkyd solution 35% _____ 614 kg. at $S_g$ 0.94 = 653.11 litres.

Total batch _____ 714 kg. at $S_g$ 1.01 = 708.67 litres.

The batch is assembled by pre-mixing the following ingredients to give it an $A_1$ value of 16 m.$^2$/c.c. of dispersion when the vehicle is a 25% solution.

The $P_v$ of the mill base is:

$$\frac{A_1}{A_v} \text{ or } \frac{16}{102} = 0.1569 \text{ cc./cc. (i.e. 15.69\%)}$$

Therefore, the volume of 25% solution which is needed in the pre-mixed mill base is:

$$\left(\frac{55.56 \times 100}{15.69}\right) - 55.56 = 298.55 \text{ litres}$$

The pre-mixed mill base then has the following contents

Milori _____ 100 kg. at $S_g$ 1.8 = 55.56 litres.
Alkyd solution 25% _____ 272 kg. at $S_g$ 0.91 = 298.55 litres.

Total pre-mixed batch _____ 372 kg. at $S_g$ 1.05 = 354.11 litres.

The diluting vehicle is a 42.95% solution of the same resin. The total diluting vehicle to be added during the dispersing process is 653.11 − 298.55 = 354.56 litres.

For purposes of dilution the sand mill grinding tank is considered to be divided into 4 equal processing zones as follows:

1st milling zone in which the undiluted mill base is milled.
2nd milling zone in which the first diluent is added.
3rd milling zone in which the 2nd diluent is added.
4th milling zone in which the 3rd diluent is added and the mill base is stabilised.

Assuming the milling tank to have a total reident millbase capacity of 27 litres and all four processing zones to be of equal size, then each processing zone has a millbase capacity of 6.75 litres.

The pre-mixed mill base is pumped into the 1st processing zone of the mill at the rate of 1.35 litres per minute and diluent is added into each of the following zones (2nd, 3rd and 4th) at the rate of 0.45 litres per minute into each zone. The volume of mill base plus diluent passing through each zone in each minute and the total residence time will be as follows:

| Zone No.: | Batch inflow per minute, litres/min. | Total residence time, minutes | $P_v$ of mill base, cc./cc. | Approximate percentage of resin in the mill base vehicle |
|---|---|---|---|---|
| 1 | 1.35 | 5.00 | 0.1569 | [1] 25 |
| 2 | 1.35 [2] 0.45 | 3.75 | 0.1167 | [3] 29.82 |
| 3 | 1.80 [2] 0.45 | 3.00 | 0.0941 | [4] 32.59 |
| 4 | 2.25 [2] 0.45 | 2.50 | 0.0784 | [5] 35.00 |
| Total | 2.70 | 14.25 | | |

[1] w./w. unstable.
[2] Diluent.
[3] Unstable.
[4] Partially stable.
[5] Fully stable.

The total final output of the mill will be 2.7 × 60 = 162 litres of dispersed, diluted and stabilised mill base per hour. The whole batch may be expected to take about 4 hours 23 minutes to pass through the mill.

Temperature rise

The total volume of diluted mill base plus diluent passing through the mill is 2.7 litres per minute, or 38.475 litres in 14.25 minutes.

If the specific heat of the outflowing mill base is taken as 0.35, and the energy to be accounted for by raising the temperature of the mill base is 20% of the total power input, or say 3 kw./min. or 43.08 kg. Cal. per minute, then the temperature rise of the outflowing material in degrees centigrade will be:

$$\frac{\text{Total heat used to raise the temperature of the mill base during residence time in kg./Cals.}}{\text{Output per minute in litres} \times \text{residence time} \times S_g \times \text{specific heat}}$$

or $$\frac{43.08 \times 14.25}{2.7 \times 14.25 \times 1.01 \times 0.35} = 45.2° \text{ C.}$$

If the average temperature of the inflowing materials is 20° C., then the temperature of the diluted mill base when leaving the mill will be 20 + 45.2 = 65.2° C.

The rate of dilution should be varied to suit the rate at which the pigment becomes wetted and dispersed. This can be determined by a simple laboratory test method.

If the diluted mill base ($F_v$ 0.0784 cc./cc.) is pumped into the mill at 1.35 litres per minute, and no further diluent is added, then the residence time will be:

$$\frac{27}{1.35} = 20 \text{ minutes}$$

Assuming the power load and heat distribution to be as before at 3 kw. or 43.08 kg./Cal. per minute, then the rise in temperautre of the mill base will be:

$$\frac{43.08 \times 20}{1.35 \times 20 \times 1.01 \times 0.35} = 90.3° \text{ C.}$$

This means that a mill base entering the mill at 20° C. has an outflow temperature of 110.3° C. less any temperature reduction resulting from the evaporation of solvent.

A diluted mill base feed rate of 2.7 litres per minute would make the residence time:

$$\frac{27}{2.7} = 10 \text{ minutes}$$

and the outflow temperature rise is then the same as the outflow temperature of the batch which is diluted whilst passing through the mill:

$$20 + \frac{43.08 \times 10}{2.7 \times 10 \times 1.01 \times 0.35} = 65.2° \text{ C.}$$

From these figures it will be noted that the improved method for sand milling now proposed will enable the time for milling the pigment to be increased by 42.5%, and will also permit the pigment to be milled at higher than normal volume concentration. The output temperature, however, will be prevented from rising above acceptable limits (65.2° C.)

It is well known that when a mill batch vehicle is heterogeneous, then the pigment will select and adsorb one or more wetting and dispersing compounds from it.

Different pigments adsorb different wetting and dispersing compounds or mixtures of such compounds from the dispersion vehicle; such adsorption is usually in an order of preference and this varies in different pigment and vehicle systems.

Many colloidal pigments adsorb such large volumes of wetting and dispersing compounds from the vehicle that when the vehicle is a solution of a resin which has only limited solvent tolerance, and when such compounds are also the peptising compounds which keep the unadsorbed resin in solution, then the stability of the resin solution may be affected and in extreme cases a partial precipitation of unadsorbed resin may take place. Such precipitation is often an irreversible process.

Phthalocyanine blue which consists of colloidal particles with $d_3$ diameter in the region of 0.056 micron and $A_v$ surface area approximately 08 m.²/cc. of net pigment volume, is typical of colloidal pigments which may adsorb an excess volume of vehicle components from the vehicle; this pigment should therefore be pre-mixed with a vehicle which contains an excess volume of resin solids and at least sufficient resin to satisfy the adsorption requirements of the pigment without endangering the stability of the unadsorbed resin solution. When milling colloidal pigments such as a phthalocyanine blue in resin solution vehicles such as a solution of a highly polymerised limed rosin in toluol, then the inventor has found that the volume of resin or resin components which become adsorbed or otherwise attached to the pigment from the resin is very often in the region of 1 cc. of resin compounds per 350 m.² of wetted pigment surface. For example, if the specific surface of a phthalocyanine blue pigment is taken as 68 m.²/gram, then the total volume of limed rosin compounds which may become adsorbed on or otherwise captured by the pigment surface per 100 kg. of phthalocyanine blue appears to be about $$\frac{68 \times 100 \times 1{,}000}{350 \times 1{,}000} = 19.43 \text{ litres (say 20 kg.) of resin}$$

compounds. As phthalocyanine blues tend to flocculate unless each pigment particle is adequately protected by a coating of dispersing resin compounds, the mill base should always contain sufficient unadsorbed resin to protect the dispersion vehicle as well as the dispersion itself against colloidal shock.

In the circumstances described the inventor has found it best to pre-mix the pigment with a vehicle containing a fairly large quantity of resin, say 40% in the case of a polymerised limed rosin, and to pump this pigmented mixture into a sand mill or a similar machine and to dilute this mill base as it flows through the mill by injecting sufficient diluting vehicle containing a lower percentage of resin than is contained in the initial pre-mixed batch vehicle but sufficient resin to ensure that the composition and viscosity of the mill base remains at the correct level during the grinding operation and that the outflowing dispersion has the right consistency and contains the required amount of resin necessary to ensure the stability of the dispersion.

Example 2

A phthalocyanine blue with $A_v$ surface area 108 m.²/cc. has ideal flow properties and stability when properly dispersed by sand milling in a polymerised limed rosin 35% solution in toluol, when the $A_1$ value of the dispersion is about 8 m.²/cc. and the $P_v$ of the paste is $$\frac{8}{108} = 0.0741 \text{ cc./cc.}$$

or 7.41%.

The pre-mixed mill base that is pumped into the mill has an $A_1$ value of 14 m.²/cc. of dispersion and its $P_v$ is $$\frac{14}{108} = 0.1296 \text{ cc./cc. or } 12.96\%$$

The resin content of the vehicle in the pre-mixed mill base is 40%.

The composition of the pre-mixed mill base is as follows:

| | | |
|---|---|---|
| Phthalocyanine blue | 100 kg. at $S_g$ 1.59 | = 62.89 litres. |
| 40% limed rosin solution | 399 kg. at $S_g$ 0.945 | =422.37 litres. |
| | 499 kg. | 485.26 litres. |

The resin and solvent contents of the pre-mixed mill base vehicle are 159.6 kg. resin and 239.4 kg. solvent. The total volume of 35% vehicle needed in the diluted mill base as it flows from the mill when the $P_v$ is 7.41% will be $$\left(\frac{62.89 \times 100}{7.41}\right) - 62.89 = 785.83 \text{ litres}$$

at $s_g$ 0.94 = 738.68 kg. 35% solution containing 258.54 kg. resin and 480.14 kg. solvent. The total dilution vehicle required is therefore 785.83 − 422.37 = 363.46 litres of diluent Containing 258.54−159.6 = 98.94 kg. of resin..
And 480.14−239.4 = 240.74 kg. of solvent.
Total = 339.68 kg. of resin.

solution containing 29.13% resin.

The diluted mill base has the following compositions:

| | | |
|---|---|---|
| Phthalocyanine blue | 100.00 kg. = | 62.89 litres. |
| 35% limed rosin solution | 738.68 kg. = | 785.83 litres. |
| | 838.68 kg. | 848.72 litres. |

The pre-mixed mill base is pumped into the first zone of the sand mill grinding chamber at the rate of 1.5 litres per minute. The time required for milling the batch is therefore approximately $$\frac{485.5}{1.5} = 323.5$$

minutes. The volume of 29.13% resin solution to be injected during this time is $$\frac{363.46}{323.5} = 1.123$$

litres per minute.

When equal volumes of diluent are injected into each of the three diluting zones of the mill, then $$\frac{1.123}{3} = 0.374$$

litres of diluent will be injected per minute into each diluting zone. In these circumstances the input into the mill and total residence time are as follows:

| Zone: | Batch plus diluent flow per minute, litres/minute | Total time of residence, minutes |
|---|---|---|
| 1 | 1.5 | 4.50 |
|   | 1.5 / [1] 0.374 |   |
| 2 |   | 3.62 |
|   | 1.874 |   |
|   | 1.874 / [1] 0.374 |   |
| 3 |   | 3.00 |
|   | 2.248 |   |
|   | 2.248 / [1] 0.374 |   |
| 4 |   | 2.57 |
|   | 2.622 |   |
| Totals | 2.622 | 13.69 |

[1] Diluent.

Taking the specific gravity of the diluted mill batch as 1.02, its specific heat as 0.38 and the heat energy not carried away by water cooling system as 43.08 kg. Cal. per minute, and also assuming that the temperature of all inflowing materials is 20° C., then the temperature of the diluted outflowing mill batch will be as follows:

$$20 + \left(\frac{43.08 \times 13.69}{2.622 \times 13.69 \times 1.02 \times 0.38}\right) = 62.4°C.$$

If the pre-mixed batch is diluted and then pumped through the mill without further dilution at the full rate of outflow (2.622 litres/minute), then the residence time in the mill will be reduced to $$\frac{27}{2.622} = 10.3$$

minutes, but the outflow temperature will be unchanged at approximately 62.4° C. The degree of dispersion, however, will be greatly inferior to batch example 2 owing to the lower pigment volume and shorter processing time when milling the dilute batch.

Many dispersions are formulated in such manner that they contain two or more different vehicles which must be wholly or partly included in the mill base during the milling processes when the milling operation is carried out in sand mills or similar machines.

In the above circumstances it is normal practice to combine such vehicles as a single milling vehicle in the proportions best suited to the pigment to be milled and to pre-mix the pigment with this vehicle mixture before feeding the resulting mill base into the mill.

The inventor has found it an advantage to pre-mix the pigment with the vehicle or vehicles which have the best wetting and dispersing properties to reduce the mill base to the consistency necessary in the first grinding stage of the milling process, and then to dilute the mill base as it flows through the milling chamber in one or more stages using one or more vehicles belonging to the batch and in the order of the excellence of their wetting and dispersing properties.

The following is an example of this method of milling using a sand mill as described in Example 1 and also used in Example 2.

Example 3

A mill base consisting of a colloidal carbon black with effective $A_v$ surface area 350 m²/cc. of nett pigment volume pre-mixed with a short oil alkyd solution in xylol is diluted in 3 stages whilst passing through the mill by using a solution containing another alkyd which has still shorter oil length and inferior pigment wetting and dispersing properties to that used in the pre-mixed mill base. The pre-mixed mill base has an effective $A_v$ value of 20 m²/cc. of dispersion. The $P_v$ of this mixture is therefore $$\frac{20}{350} = 0.0571 \text{ cc./cc.}$$

or 5.71%. The $A_1$ value of the diluted mill base as it flows from the mill is 10 m²/cc. and the $P_v$ of this dispersion is then $$\frac{10}{350} = 0.0286 \text{ cc./cc.}$$

or 2.86%.

A mill base is made up as follows (litres):

Carbon black ........... 100.00 kg. at $S_g$ 1.75 = 57.14
Alkyd Resin No. 1 (45% NV) 57.14×100 / 5.71
   —57.14 = 943.56 litres ........... 934.12 kg. at $S_g$ 0.99 = 943.56
                                              1,034.12 kg.      1,000.70

This mixture is pre-mixed and pumped into the sand mill at the rate of 2 litres per minute and diluted with a 50% solution of alkyd No. 2 so that the $P_v$ is reduced from 5.71% to 2.86%. The volume of alkyd solution No. 2 used is $$\left(\frac{1,000.7 \times 5.71}{2.86}\right) - 1,000.7 =$$

997.2 litres at $S_g$ 0.96 = 957.3 kg.

The time required to mill the batch is $$\frac{1,000.70}{2} = 500.35$$

minutes and the dilution is therefore injected at the rate of $$\frac{997.20}{500.35} = 1.993$$

or say 2 litres per minute into 3 diluting zones at the rate of $$\frac{2}{3} = 0.667$$

litres per minute into each zone. The outflowing mill base has the following composition:

Carbon black ................ 100.00 kg. at $S_g$ 1.75 = 57.14 litres.
Alkyd No. 1 (40%) ........... 934.12 kg. at $S_g$ 0.99 = 943.56 litres.
Alkyd No. 2 (50%) ........... 957.30 kg. at $S_g$ 0.96 = 997.20 litres.
   Total batch .............. 1,991.42 kg. at $S_g$ 1.00 = 1,997.90 litres.

In these circumstances the input into the mill and the total residence time is as follows:

| Zone: | Batch plus diluent flow per minute, litres/minute | Total time of residence, minutes |
|---|---|---|
| 1 | 2.000 | 3.375 |
|   | 2.000 / [1] 0.667 |   |
| 2 |   | 2.531 |
|   | 2.667 |   |
|   | 2.667 / [1] 0.667 |   |
| 3 |   | 2.025 |
|   | 3.334 |   |
|   | 3.334 / [1] 0.667 |   |
| 4 |   | 1.662 |
|   | 4.001 |   |
| Totals | 4.001 | 9.593 |

[1] Diluent.

It is assumed that the amount of heat to be accounted for by a rise in the temperature of the mill batch is the same as in Examples 1 and 2 (43.08 kg. Cal. per minute). Taking the specific heat of the mill base as 0.40, also taking the temperatures of the inflowing materials as 20°

C., then the temperatures of the batch will rise to approximately:

$$20 + \frac{43.08 \times 9.593}{4.001 \times 9.593 \times 1 \times 0.40} = 46.9° \text{ C.}$$

If the unmilled but diluted mill base is pumped through the mill at the rate of 4.001 litres per minute without further dilution, then the temperature at the delivery point will be approximately the same (46.9° C.) but the batch residence time in the mill will be reduced to approximately 27/4=6.75 minutes. The dispersion in these circumstances will be very inferior to that obtained in the example because the batch is milled in a more dilute state in all but the last zone of the milling chamber, and passes through the mill far more rapidly.

The designers of the known apparatus are aware that over-heating of the mill base is unavoidable if the mill base residence time is prolonged. They have therefore designed the pump feed to the grinding tank so that very slow input rates are not possible.

Use of the improved process should mean that the majority of mill bases which normally require to be milled more than once can be dispersed in a single operation without overheating the mill base, and this necessitates modification of the drive of the feed pump to slow down the rate of feed and it will be apparent various simple alternative methods for varying the rate of feed of diluting vehicle into one or more sections of the milling tank could be used.

I claim:
1. A continuous process for dispersing pigments in liquid media which comprises causing a mill base to flow by gravity through a grinding tank in which it is agitated with solid grinding material, diluting the mill base by substantially continuously injecting a variable volume of a suitable diluting vehicle into at least one point of a milling chamber so as to ensure that the consistency of the mill base does not increase to the point where the milling efficiency of the machine is reduced and the mill base fails to flow sufficiently rapidly through any screen which is used to separate the mill base from the grinding media at the conclusion of the grinding process.

2. A method as set forth in claim 1 in which the composition of the mill base vehicle is adjusted during the milling process so as to increase the vehicle solids content of the mill base vehicle whilst the mill base is flowing through the mill.

3. A method as set forth in claim 1 which comprises injecting into the mill base as it flows through the mill at least one liquid vehicle which belongs to the final product but differs from the vehicle contained in the mill base when entering the grinding chamber.

4. A method as set forth in claim 1, in which there is injected at least one diluting vehicle containing a lower proportion of non-volatile vehicle ingredients than is contained in the mill base vehicle when entering the grinding chamber.

5. A method as set forth in claim 1, in which a cool diluting vehicle is injected into the grinding tank to reduce the temperature of the mill base in the grinding tank and allow the time the mill base may be permitted to remain in residence in the grinding tank to be extended beyond the time which is normally permissible without dilution.

References Cited

UNITED STATES PATENTS

| | | | |
|---|---|---|---|
| 2,581,414 | 1/1952 | Hochberg | 241—22 |
| 3,185,398 | 5/1965 | Hughes | 241—21 X |
| 2,982,666 | 5/1961 | Chun | 106—308 |
| 3,229,917 | 1/1966 | Miller | 241—16 |
| 3,254,034 | 5/1966 | Dwyer | 241—16 X |

ROBERT C. RIORDON, Primary Examiner

D. G. KELLY, Assistant Examiner